United States Patent
Sudo (10) Patent No.: US 12,181,914 B2
(45) Date of Patent: Dec. 31, 2024

(54) REAL-TIME CLOCK MODULE

(71) Applicant: SEIKO EPSON CORPORATION, Tokyo (JP)

(72) Inventor: Yasuhiro Sudo, Chino (JP)

(73) Assignee: SEIKO EPSON CORPORATION (JP)

(*) Notice: Subject to any disclaimer, the term of this patent is extended or adjusted under 35 U.S.C. 154(b) by 65 days.

(21) Appl. No.: 18/306,274

(22) Filed: Apr. 25, 2023

(65) Prior Publication Data

US 2023/0341893 A1  Oct. 26, 2023

(30) Foreign Application Priority Data

Apr. 26, 2022 (JP) ................................ 2022-072223

(51) Int. Cl.
*G06F 1/14* (2006.01)
*G06F 1/10* (2006.01)

(52) U.S. Cl.
CPC . *G06F 1/14* (2013.01); *G06F 1/10* (2013.01)

(58) Field of Classification Search
CPC ........................................................ G06F 1/14
USPC ........................................................ 327/291
See application file for complete search history.

(56) References Cited

U.S. PATENT DOCUMENTS 11,777,496 B1* 10/2023 Chakraborty .......... G06N 10/40
                                                          327/291

FOREIGN PATENT DOCUMENTS

JP         2009-019996 A     1/2009

* cited by examiner

*Primary Examiner* — Tomi Skibinski
(74) *Attorney, Agent, or Firm* — Harness, Dickey & Pierce, P.L.C.

(57) ABSTRACT

A real-time clock module includes: a timing circuit configured to measure a time to generate time data; a selection circuit configured to select at least one of a plurality of types of event data as target event data to be stored and select, as target time data to be stored, data corresponding to at least a part of time digits of the time data in response to generation of an event; and a memory circuit configured to store the target time data and the target event data.

10 Claims, 6 Drawing Sheets

| address | data |  |  |  |  |  |  |  |
|---|---|---|---|---|---|---|---|---|
|  | bit7 | bit6 | bit5 | bit4 | bit3 | bit2 | bit1 | bit0 |
| 0x0 | SSB[5] | SSB[4] | SSB[3] | SSB[2] | SSB[1] | SSB[0] | CPEPOL EVIN3 | CPEPOL EVIN2 |
| 0x1 | S8 | S4 | S2 | S1 | SSB[9] | SSB[8] | SSB[7] | SSB[6] |
| 0x2 | M10 | M8 | M4 | M2 | M1 | S40 | S20 | S10 |
| 0x3 | H20 | H10 | H8 | H4 | H2 | H1 | M40 | M20 |
| 0x4 | MO2 | MO1 | D20 | D10 | D8 | D4 | D2 | D1 |
| 0x5 | Y10 | Y8 | Y4 | Y2 | Y1 | MO10 | MO8 | MO4 |
| 0x6 | VBATLOW Stat | VTMPLOW Stat | VDDLOW Stat | FST Stat | CPEPOL EVIN1 | Y80 | Y40 | Y20 |
| 0x7 | CPEvnt EVIN3 | CPEvnt EVIN2 | CPEvnt EVIN1 | CPEvnt VBATLOW | CPEvnt VTMPLOW | CPEvnt VDDLOW | CPEvnt FST | CPEvnt WRCom |

| address | data | | | | | | | |
|---|---|---|---|---|---|---|---|---|
| | bit7 | bit6 | bit5 | bit4 | bit3 | bit2 | bit1 | bit0 |
| 0x0 | 0 | S40 | S20 | S10 | S8 | S4 | S2 | S1 |
| 0x1 | 0 | M40 | M20 | M10 | M8 | M4 | M2 | M1 |
| 0x2 | 0 | 0 | H20 | H10 | H8 | H4 | H2 | H1 |
| 0x3 | 0 | 0 | D20 | D10 | D8 | D4 | D2 | D1 |
| 0x4 | CPEPOLEVIN3 | CPEPOLEVIN2 | CPEPOLEVIN1 | MO10 | MO8 | MO4 | MO2 | MO1 |
| 0x5 | Y80 | Y40 | Y20 | Y10 | Y8 | Y4 | Y2 | Y1 |
| 0x6 | SEN[15] | SEN[14] | SEN[13] | SEN[12] | SEN[11] | SEN[10] | SEN[9] | SEN[8] |
| 0x7 | SEN[7] | SEN[6] | SEN[5] | SEN[4] | SEN[3] | SEN[2] | SEN[1] | SEN[0] |

REAL-TIME CLOCK MODULE

The present application is based on, and claims priority from JP Application Serial Number 2022-072223, filed Apr. 26, 2022, the disclosure of which is hereby incorporated by reference herein in its entirety.

BACKGROUND

1. Technical Field

The present disclosure relates to a real-time clock module.

2. Related Art

JP-A-2009-019996 discloses an event recorder including: a timing unit that performs timing to generate time data composed of a plurality of digits; a memory that records the time data; a recording digit setting unit that selects a part of the digits of the time data including the plurality of digits; an event detection circuit that detects generation of an event; and a control circuit that records the time data including only the digits selected by the recording digit setting unit and the generation of the event in the memory when the event is generated. According to the event recorder, the amount of the time data recorded in the memory can be reduced, and the capacity of the memory can be saved.

However, in the event recorder described in JP-A-2009-019996, the digits of the time data to be stored in the memory during the generation of the event can be selected, but the type of event data to be stored at the same time is fixed, and unnecessary event data may be stored in the memory depending on an application.

SUMMARY

A real-time clock module according to one aspect of the present disclosure includes:
 a timing circuit configured to measure a time to generate time data;
 a selection circuit configured to select at least one of a plurality of types of event data as target event data to be stored and select, as target time data to be stored, data corresponding to at least a part of time digits of the time data in response to generation of an event; and
 a memory circuit configured to store the target time data and the target event data.

DESCRIPTION OF EXEMPLARY EMBODIMENTS

Hereinafter, a preferred embodiment of the present disclosure will be described in detail with reference to the drawings. The embodiments to be described below do not unduly limit contents of the present disclosure described in the claims. Not all configurations to be described below are necessarily essential components of the present disclosure.

1. First Embodiment

Figure 1:
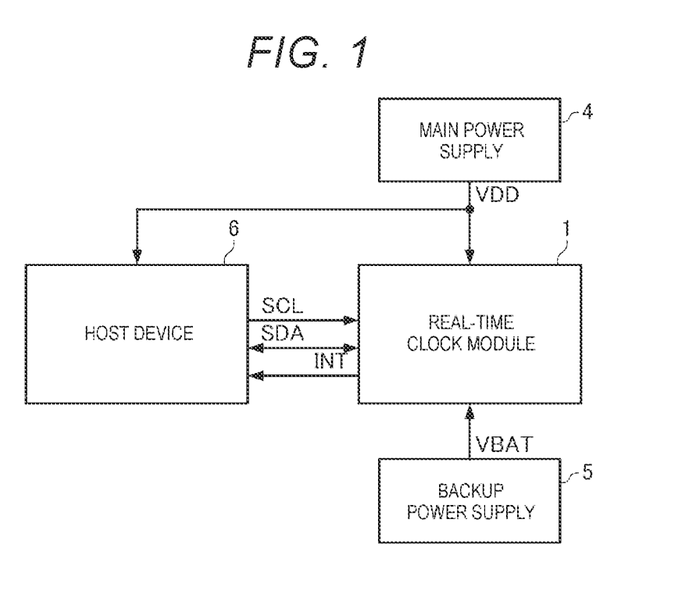
FIG. 1 is a diagram showing a configuration example of a system including a real-time clock module according to a first embodiment.

FIG. 1 is a diagram showing a configuration example of a system including a real-time clock module according to a first embodiment.

As shown in FIG. 1, the real-time clock module 1 according to the first embodiment is coupled to a main power supply 4, a backup power supply 5, and a host device 6.

The real-time clock module 1 is supplied with the power supply voltage VDD from the main power supply 4 and supplied with the power supply voltage VBAT from the backup power supply 5. The real-time clock module 1 operates at the power supply voltage VDD when the power supply voltage VDD is supplied from the main power supply 4, and operates at the power supply voltage VBAT when the supply of the power supply voltage VDD from the main power supply 4 is cut off. Therefore, the real-time clock module 1 can continue a timing operation even while the supply of the power supply voltage VDD from the main power supply 4 is cut off.

The host device 6 operates by being supplied with the power supply voltage VDD from the main power supply 4. In the embodiment, the host device 6 and the real-time clock module 1 communicate with each other via an I²C bus with the host device 6 as a master and the real-time clock module 1 as a slave. I²C is an abbreviation for an inter-integrated circuit. The host device 6 is implemented by, for example, an MCU or an MPU. The MCU is an abbreviation for a micro controller unit, and the MPU is an abbreviation for a micro processor unit.

Figure 2:
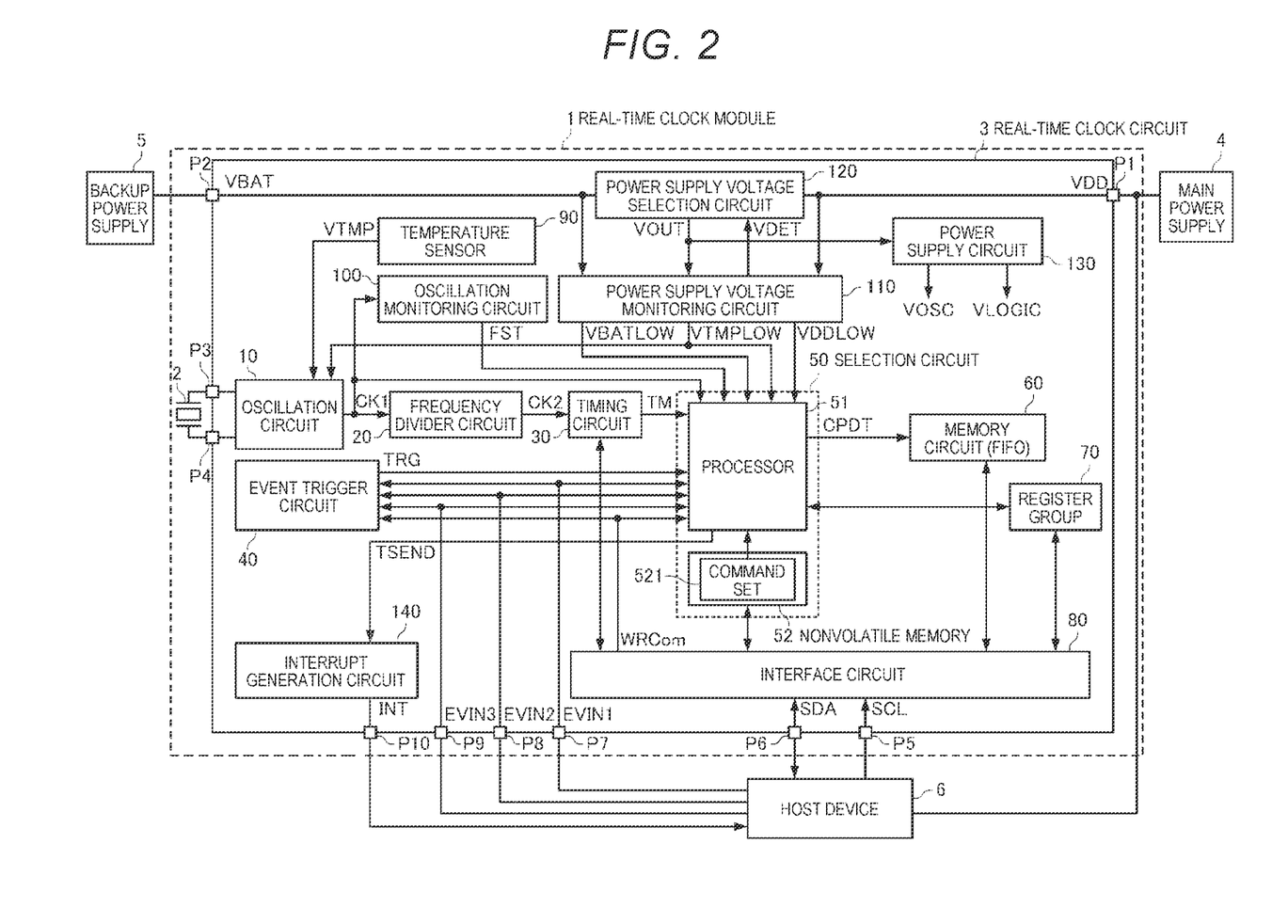
FIG. 2 is a functional block diagram of the real-time clock module according to the first embodiment.

FIG. 2 is a functional block diagram of the real-time clock module 1 according to the first embodiment. As shown in FIG. 2, the real-time clock module 1 includes a resonator 2 and a real-time clock circuit 3.

The real-time clock module 1 is supplied with the power supply voltage VDD from the main power supply 4 via a terminal P1 of the real-time clock circuit 3, and is supplied with the power supply voltage VBAT from the backup power supply 5 via a terminal P2 of the real-time clock circuit 3.

The resonator 2 may be a tuning fork type quartz crystal resonator, an AT cut quartz crystal resonator, an SC cut quartz crystal resonator, and the like, or may be a piezoelectric resonator other than a SAW resonator or a quartz crystal resonator. The SAW is an abbreviation for a surface acoustic wave. The resonator 2 may be a MEMS resonator made of a silicon semiconductor. MEMS is an abbreviation for micro electro mechanical systems. The resonator 2 may be excited by a piezoelectric effect or may be driven by a Coulomb force.

The real-time clock circuit 3 includes an oscillation circuit 10, a frequency divider circuit 20, a timing circuit 30, an event trigger circuit 40, a selection circuit 50, a memory circuit 60, a register group 70, an interface circuit 80, a temperature sensor 90, an oscillation monitoring circuit 100, a power supply voltage monitoring circuit 110, a power supply voltage selection circuit 120, a power supply circuit 130, and an interrupt generation circuit 140. However, the real-time clock circuit 3 may have a configuration in which a part of the elements are omitted or changed, or other elements are added. In the embodiment, the real-time clock circuit 3 is a one-chip integrated circuit. The real-time clock circuit 3 may include a multiple-chip integrated circuit, or at least a part thereof may be implemented by discrete components.

The power supply voltage monitoring circuit 110 monitors the power supply voltage VDD, determines whether the power supply voltage VDD is equal to or higher than a predetermined voltage value VT1, and outputs a determination signal VDET. In the embodiment, the power supply voltage monitoring circuit 110 outputs the determination signal VDET at a high level when it is determined that the power supply voltage VDD is equal to or higher than the voltage value VT1, and outputs the determination signal VDET at a low level when it is determined that the power supply voltage VDD is lower than the voltage value VT1.

The power supply voltage monitoring circuit 110 monitors the power supply voltage VDD, determines whether the power supply voltage VDD is equal to or lower than a predetermined voltage value VT2, and outputs a first power supply voltage drop signal VDDLOW. In the embodiment, the power supply voltage monitoring circuit 110 outputs the first power supply voltage drop signal VDDLOW at a high level when it is determined that the power supply voltage VDD is equal to or lower than the voltage value VT2, and outputs the first power supply voltage drop signal VDDLOW at a low level when it is determined that the power supply voltage VDD is higher than the voltage value VT2. The voltage value VT2 may be the same as or different from the voltage value VT1.

The power supply voltage monitoring circuit 110 monitors the power supply voltage VBAT, determines whether the power supply voltage VBAT is equal to or lower than a predetermined voltage value VT3, and outputs a second power supply voltage drop signal VBATLOW. In the embodiment, the power supply voltage monitoring circuit 110 outputs the second power supply voltage drop signal VBATLOW at a high level when it is determined that the power supply voltage VBAT is equal to or lower than the voltage value VT3, and outputs the second power supply voltage drop signal VBATLOW at a low level when it is determined that the power supply voltage VBAT is higher than the voltage value VT3.

The power supply voltage monitoring circuit 110 monitors a power supply voltage VOUT output from the power supply voltage selection circuit 120, determines whether the power supply voltage VOUT is equal to or lower than a predetermined voltage value VT4, and outputs a third power supply voltage drop signal VTMPLOW. In the embodiment, the power supply voltage monitoring circuit 110 outputs the third power supply voltage drop signal VTMPLOW at a high level when it is determined that the power supply voltage VOUT is equal to or lower than the voltage value VT4, and outputs the third power supply voltage drop signal VTMPLOW at a low level when it is determined that the power supply voltage VOUT is higher than the voltage value VT4.

As described above, the power supply voltage monitoring circuit 110 monitors the power supply voltages VDD, VBAT, and VOUT, and generates the first power supply voltage drop signal VDDLOW, the second power supply voltage drop signal VBATLOW, and the third power supply voltage drop signal VTMPLOW which are power supply voltage monitoring data.

The power supply voltage selection circuit 120 selects the power supply voltage VDD or the power supply voltage VBAT based on the determination signal VDET, and outputs the selected power supply voltage as the power supply voltage VOUT. Specifically, when the determination signal VDET is at a high level, that is, when the power supply voltage monitoring circuit 110 determines that the power supply voltage VDD is equal to or higher than the voltage value VT1, the power supply voltage selection circuit 120 selects the power supply voltage VDD. When the determination signal VDET is at a low level, that is, when the power supply voltage monitoring circuit 110 determines that the power supply voltage VDD is lower than the voltage value VT1, the power supply voltage selection circuit 120 selects the power supply voltage VBAT.

Therefore, when the power supply voltage VDD is supplied from the main power supply 4 to the real-time clock module 1, the power supply voltage VOUT is the power supply voltage VDD and has a predetermined voltage value equal to or higher than the voltage value VT1. When a supply of the power supply voltage VDD from the main power supply 4 to the real-time clock module 1 is cut off, the power supply voltage VOUT is immediately switched to the power supply voltage VBAT and becomes a predetermined voltage value equal to or lower than the voltage value VT1. Therefore, the real-time clock module 1 can continue the timing operation even while the supply of the power supply voltage VDD from the main power supply 4 is cut off. On the other hand, the host device 6 that controls an operation of the real-time clock module 1 operates by being supplied with the power supply voltage VDD from the main power supply 4, and stops the operation when the supply of the power supply voltage VDD from the main power supply 4 is cut off.

The power supply circuit 130 generates, based on the power supply voltage VOUT, a power supply voltage VOSC and a power supply voltage VLOGIC stabilized at a constant voltage value. The power supply circuit 130 is implemented by, for example, a regulator.

The power supply voltage VOSC is supplied to the oscillation circuit 10. The power supply voltage VLOGIC is supplied to the frequency divider circuit 20, the timing circuit 30, the event trigger circuit 40, the selection circuit 50, the memory circuit 60, the register group 70, the interface circuit 80, the temperature sensor 90, the oscillation monitoring circuit 100, the power supply voltage monitoring circuit 110, and the interrupt generation circuit 140.

The temperature sensor 90 outputs a temperature signal VTMP whose magnitude changes according to a temperature. The temperature signal VTMP may be a digital signal or an analog signal.

The oscillation circuit 10 oscillates the resonator 2 to generate a first clock signal CK1. Specifically, the oscillation circuit 10 is electrically coupled to both ends of the resonator 2 via terminals P3 and P4 of the real-time clock circuit 3, and amplifies and feeds back an output signal of the resonator 2 to oscillate the resonator 2 to output the first clock signal CK1. The oscillation circuit 10 incorporates a temperature compensation circuit that controls a frequency of the first clock signal CK1 to be constant regardless of the temperature by changing the frequency of the first clock signal CK1 according to the temperature signal VTMP output from the temperature sensor 90. In the embodiment, the frequency of the first clock signal CK1 is 32.768 kHz. However, the frequency of the first clock signal CK1 is not particularly limited. In the embodiment, when the power supply voltage VOUT is higher than the voltage value VT4, that is, when the third power supply voltage drop signal VTMPLOW is at a low level, the temperature compensation circuit operates normally. On the other hand, when the power supply voltage VOUT is equal to or lower than the voltage value VT4, that is, when the third power supply voltage drop signal VTMPLOW is at a high level, a normal operation of the temperature compensation circuit is not guaranteed, and thus the temperature compensation circuit stops the operation.

The oscillation monitoring circuit 100 monitors the first clock signal CK1, determines whether an oscillation operation of the oscillation circuit 10 is stopped, and outputs an oscillation stop signal FST. In the embodiment, the oscillation monitoring circuit 100 determines that the oscillation operation of the oscillation circuit 10 is stopped when a logic level of the first clock signal CK1 continues for a predetermined time and is not inverted within the predetermined time, and outputs the oscillation stop signal FST at a high level. When the logic level of the first clock signal CK1 is inverted within the predetermined time, the oscillation monitoring circuit 100 determines that the oscillation operation of the oscillation circuit 10 does not stop, and outputs the oscillation stop signal FST at a low level. As described above, the oscillation monitoring circuit 100 monitors the first clock signal CK1 and generates the oscillation stop signal FST which is oscillation monitoring data.

The frequency divider circuit 20 divides the frequency of the first clock signal CK1 to generate a second clock signal CK2 having a desired frequency. In the embodiment, a frequency division ratio of the frequency divider circuit 20 is 32, and a frequency of the second clock signal CK2 is 1.024 kHz. However, the frequency division ratio of the frequency divider circuit 20 and the frequency of the second clock signal CK2 are not particularly limited.

The timing circuit 30 measures a time based on the second clock signal CK2 to generate time data TM. In the embodiment, the time data TM has $1/1024$ seconds, seconds, minutes, hours, days, months, and years as time digits. Specifically, the time data TM includes subsecond data in a binary format in which the time in units of $1/1024$ seconds is represented by 0 to 1023, second data in a BCD format in which the time in units of seconds is represented by 0 to 59, minute data in a BCD format in which the time in units of minutes is represented by 0 to 59, hour data in a BCD format in which the time in units of hours is represented by 0 to 23, day data in a BCD format in which the time in units of days is represented by 1 to 31, month data in a BCD format in which the time in units of months is represented by 1 to 12, and year data in a BCD format in which the time in units of years is represented by 0 to 9999. BCD is an abbreviation for binary coded decimal.

The event trigger circuit 40 receives a first event signal EVIN1, a second event signal EVIN2, and a third event signal EVIN3 received from the host device 6 via terminals P7, P8, and P9 of the real-time clock circuit 3. An event command detection signal WRCom output from the interface circuit 80 is input to the event trigger circuit 40. The first power supply voltage drop signal VDDLOW, the second power supply voltage drop signal VBATLOW, and the third power supply voltage drop signal VTMPLOW output from the power supply voltage monitoring circuit 110 are input to the event trigger circuit 40. The oscillation stop signal FST output from the oscillation monitoring circuit 100 is input to the event trigger circuit 40. When a rising edge of at least one of the event command detection signal WRCom, the first power supply voltage drop signal VDDLOW, the second power supply voltage drop signal VBATLOW, the third power supply voltage drop signal VTMPLOW, and the oscillation stop signal FST occurs, the event trigger circuit 40 outputs a high-pulse event trigger signal TRG. When at least one of an edge specified by the first event signal EVIN1, an edge specified by the second event signal EVIN2, and an edge specified by the third event signal EVIN3 occurs, the event trigger circuit 40 outputs the high-pulse event trigger signal TRG. Each edge of the first event signal EVIN1, the second event signal EVIN2, and the third event signal EVIN3 that generates the event trigger signal TRG may be able to specify a rising edge, a falling edge, or both the rising edge and the falling edge by an event control register included in the register group 70.

In response to the generation of the event, the selection circuit 50 selects at least one of a plurality of types of event data as target event data to be stored, and selects, as target time data to be stored, data corresponding to at least a part of time digits of the time data TM generated by the timing circuit 30. That is, the selection circuit 50 selects the target event data and the target time data in response to the event trigger signal TRG output from the event trigger circuit 40.

The plurality of types of event data may include the first power supply voltage drop signal VDDLOW, the second power supply voltage drop signal VBATLOW, and the third power supply voltage drop signal VTMPLOW, which are the power supply voltage monitoring data generated by the power supply voltage monitoring circuit 110. The plurality of types of event data may include the oscillation stop signal FST which is the oscillation monitoring data generated by the oscillation monitoring circuit 100.

The event may be generated by an external input signal received from the outside of the real-time clock module 1, and the plurality of types of event data may include data corresponding to the external input signal. In the embodiment, the external input signals are the first event signal EVIN1, the second event signal EVIN2, the third event signal EVIN3, and an event generation command for generating an event, and the data corresponding to the external input signals are the first event signal EVIN1, the second event signal EVIN2, the third event signal EVIN3, and the event command detection signal WRCom.

The selection circuit 50 causes the memory circuit 60 to store the capture data CPDT including the target time data and the target event data. That is, the selection circuit 50 performs time stamp processing of causing the memory circuit 60 to store the target time data and the target event data in association with each other in response to the event trigger signal TRG.

In the embodiment, the selection circuit 50 includes a processor 51 and a nonvolatile memory 52. The nonvolatile memory 52 stores a command set 521 that specifies the target time data and the target event data. The processor 51 selects the target time data and the target event data based on the command set 521 in synchronization with the first clock signal CK1, and causes the memory circuit 60 to store the target time data and the target event data. That is, the command set 521 includes a plurality of command codes necessary for the selection circuit 50 to perform the time stamp processing.

In order to reduce the power consumption, the processor 51 may return from the sleep state by the generation of the event trigger signal TRG, perform the control processing of the power supply circuit 130 and the time stamp processing, and shift to the sleep state again when the processing is completed.

Figure 3:
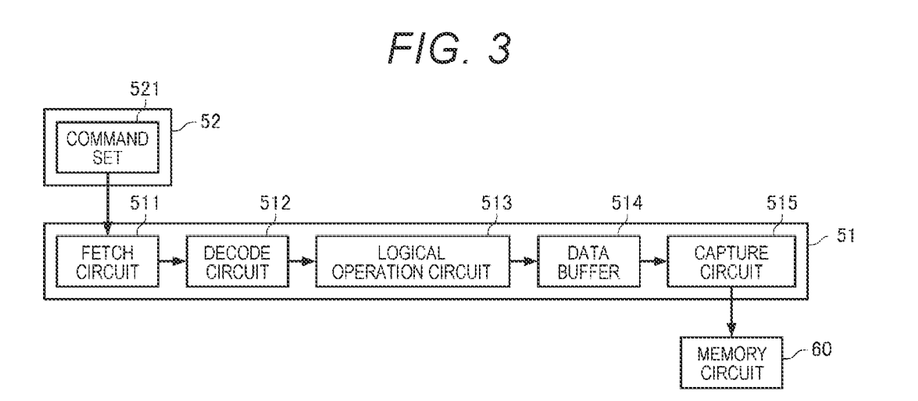
FIG. 3 is a diagram showing a configuration example of a processor.

FIG. 3 is a diagram showing a configuration example of the processor 51. As shown in FIG. 3, the processor 51 includes a fetch circuit 511, a decode circuit 512, a logical operation circuit 513, a data buffer 514, and a capture circuit 515.

The fetch circuit 511 sequentially fetches command codes included in the command set 521 in synchronization with the first clock signal CK1.

The decode circuit 512 sequentially decodes the command codes fetched by the fetch circuit 511 in synchronization with the first clock signal CK1, and outputs a control signal corresponding to the decode result.

The logical operation circuit 513 performs, on one or two types of input data selected from a plurality of types of input data according to the control signal output from the decode circuit 512, a logical operation selected from a plurality of types of logical operations according to the control signal. The plurality of types of input data include the subsecond data, the second data, the minute data, the hour data, the day data, the month data, and the year data included in the time data TM, the first power supply voltage drop signal VDDLOW, the second power supply voltage drop signal VBATLOW, the third power supply voltage drop signal VTMPLOW, the oscillation stop signal FST, the first event signal EVIN1, the second event signal EVIN2, the third event signal EVIN3, the event command detection signal WRCom, and the like included in the plurality of types of event data. The plurality of types of logical operations include, for example, a through operation, a NOT operation, an AND operation, an OR operation, an XOR operation, a bit shift operation, an addition, and a subtraction.

The data buffer 514 holds data output from the logical operation circuit 513 in synchronization with the first clock signal CK1.

The capture circuit 515 writes the data held by the data buffer 514 to a current address of the memory circuit 60 and increments the address in synchronization with the first clock signal CK1 according to the control signal output from the decode circuit 512. The data buffer 514 sequentially holds, for example, 8-bit data constituting the capture data CPDT, and the capture circuit 515 writes the data to the memory circuit 60.

In the embodiment, when the event trigger signal TRG is generated according to the command set 521, the processor 51 can cause the memory circuit 60 to store the capture data CPDT including the selected target time data and target event data. That is, any type of data constituting the capture data CPDT can be selected by the command set 521.

When the event trigger signal TRG is generated according to the command set 521, the processor 51 can perform the time stamp processing only when a generation factor of the event trigger signal TRG is any one or more types of signals selected from the first power supply voltage drop signal VDDLOW, the second power supply voltage drop signal VBATLOW, the third power supply voltage drop signal VTMPLOW, the oscillation stop signal FST, the first event signal EVIN1, the second event signal EVIN2, the third event signal EVIN3, and the event command detection signal WRCom. That is, a signal which is a trigger factor of the time stamp processing can be freely selected by the command set 521. For example, when only the first event signal EVIN1 is selected by the command set 521 as a signal which is the trigger factor of the time stamp processing, the processor 51 can determine whether the generation factor of the event trigger signal TRG is the first event signal EVIN1 based on a logic level of the first event signal EVIN1 when the event trigger signal TRG is generated, and can determine whether to perform the time stamp processing based on the determination result.

Returning to the description of FIG. 2, the memory circuit 60 stores the capture data CPDT including the target time data and the target event data selected by the selection circuit 50. In the embodiment, the memory circuit 60 is a volatile memory such as an SRAM, and functions as an N-stage FIFO capable of storing N pieces of capture data CPDT. That is, the memory circuit 60 can simultaneously store the N pieces of the capture data CPDT for the generation of N events. SRAM is an abbreviation for a static random access memory, and FIFO is an abbreviation for first in first out.

When the time stamp processing based on the event trigger signal TRG ends, the processor 51 outputs a time stamp end signal TSEND to the interrupt generation circuit 140.

The interrupt generation circuit 140 generates an interrupt signal INT based on the time stamp end signal TSEND, and outputs the interrupt signal INT to the host device 6 via a terminal P10 of the real-time clock circuit 3. When receiving the interrupt signal INT, the host device 6 performs predetermined interrupt processing. For example, the host device 6 transmits a command for requesting data reading of a time stamp to the real-time clock module 1, and receives the capture data CPDT stored in the memory circuit 60 from the real-time clock module 1.

In order to reduce the power consumption of the entire system, the host device 6 shifts to the sleep state when the processing is not performed, returns from the sleep state to perform processing of reading the data of the time stamp when receiving the interrupt signal INT in the sleep state, and shifts to the sleep state again when necessary processing ends.

The register group 70 includes various registers. For example, the register group 70 includes an event control register, a flag register, a command trigger register, and the like. The event control register holds, for example, 2-bit data for specifying one of a rising edge, a falling edge, and both the rising edge and the falling edge as each of the edges of the first event signal EVIN1, the second event signal EVIN2, and the third event signal EVIN3 that generate the event trigger signal TRG. The flag register holds a first power supply voltage drop flag in which 1 is set by the generation of the rising edge of the first power supply voltage drop signal VDDLOW, a second power supply voltage drop flag in which 1 is set by the generation of the rising edge of the second power supply voltage drop signal VBATLOW, a third power supply voltage drop flag in which 1 is set by the generation of the rising edge of the third power supply voltage drop signal VTMPLOW, an oscillation stop flag in which 1 is set by the generation of the rising edge of the oscillation stop signal FST, and the like. The command trigger register is a register for generating the event command detection signal WRCom in response to the event generation command.

The interface circuit 80 is an interface circuit for communication between the real-time clock module 1 and the host device 6. In the communication by the interface circuit 80, the host device 6 is a master and the real-time clock module 1 is a slave. That is, the interface circuit 80 functions as a slave interface for the host device 6. In the embodiment, the interface circuit 80 is an interface circuit compatible with the I²C bus, and communicates with the host device 6 based on a serial clock signal SCL input via a terminal P5 of the real-time clock circuit 3 and a serial data signal SDA input and output via a terminal P6 of the real-time clock circuit 3.

However, the interface circuit 80 may be an interface circuit compatible with other serial buses such as SPI, or may be an interface circuit compatible with a parallel bus. SPI is an abbreviation for a serial peripheral interface.

The interface circuit 80 receives a command from the host device 6 via the terminals P5 and P6, and performs various types of processing according to the received command.

Specifically, when the interface circuit 80 receives a command for requesting time setting from the host device 6, the interface circuit 80 updates the time data TM generated by the timing circuit 30 to the time data included in the command.

When the interface circuit 80 receives a command for requesting time reading from the host device 6, the interface circuit 80 acquires the time data TM generated by the timing circuit 30 and transmits the time data TM to the host device 6.

When the interface circuit 80 receives a command for requesting data reading of the time stamp from the host device 6, the interface circuit 80 reads the capture data CPDT from the memory circuit 60 and transmits the capture data CPDT to the host device 6.

When the interface circuit 80 receives, from the host device 6, a command for requesting writing or reading of data to or from the various registers included in the register group 70, the interface circuit 80 performs writing or reading of data to or from a target register. For example, the interface circuit 80 generates the event command detection signal WRCom when receiving an event generation command which is a command for requesting writing of any data to the command trigger register.

When the interface circuit 80 receives, from the host device 6, a command for requesting writing or reading of data to or from the nonvolatile memory 52, the interface circuit 80 performs writing or reading of data to or from the nonvolatile memory 52. For example, in inspection processing before shipment of the real-time clock module 1, an inspection device functioning as the host device 6 transmits a command for requesting writing of the command set 521 to the nonvolatile memory 52, and the interface circuit 80 receives the command and writes the command set 521 to the nonvolatile memory 52.

Figure 4:
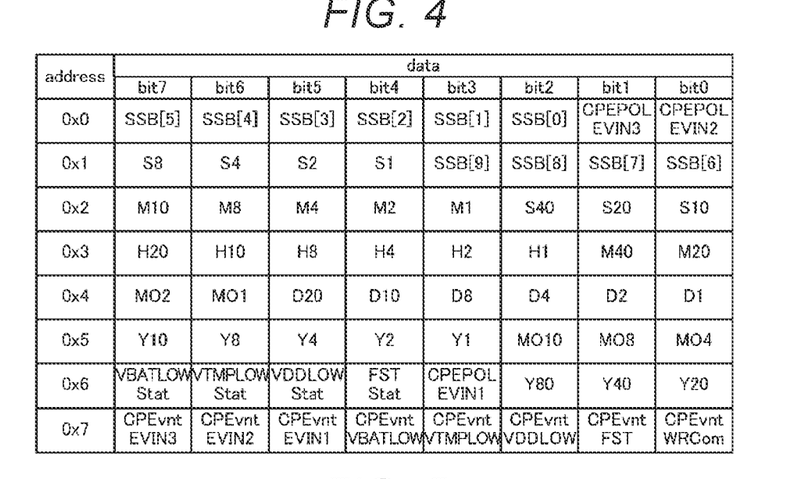
FIG. 4 is a diagram showing an example of capture data in the first embodiment.

FIG. 4 is a diagram showing an example of the capture data CPDT stored in the memory circuit 60. In the example of FIG. 4, the capture data CPDT is 64-bit data, and is stored in, for example, addresses 0x0 to 0x7 of the memory circuit 60.

Specifically, at the address 0x0 of the memory circuit 60, the lower 6-bit data of the 10-bit subsecond data included in the time data TM is stored in the bits 7 to 2, data corresponding to a logic level of the third event signal EVIN3 is stored in the bit 1, and data corresponding to a logic level of the second event signal EVIN2 is stored in the bit 0.

At the address 0x1 of the memory circuit 60, the lower 4-bit data of the 7-bit second data included in the time data TM is stored in the bits 7 to 4, and the upper 4-bit data of the 10-bit subsecond data is stored in the bits 3 to 0.

At the address 0x2 of the memory circuit 60, the 5-bit minute data included in the time data TM is stored in the bits 7 to 3, and the upper 3-bit data of the 7-bit second data is stored in the bits 2 to 0.

At the address 0x3 of the memory circuit 60, the 6-bit hour data included in the time data TM is stored in the bits 7 to 2, and the upper 2-bit data of the 7-bit minute data is stored in the bits 1 to 0.

At the address 0x4 of the memory circuit 60, the lower 2-bit data of the 5-bit month data included in the time data TM is stored in the bits 7 to 6, and the 6-bit day data included in the time data TM is stored in the bits 5 to 0.

At the address 0x5 of the memory circuit 60, the lower 5-bit data of the 8-bit year data included in the time data TM is stored in the bits 7 to 3, and the upper 3-bit data of the 5-bit month data is stored in the bits 2 to 0.

At the address 0x6 of the memory circuit 60, data corresponding to a logic level of the second power supply voltage drop signal VBATLOW is stored in the bit 7, data corresponding to a logic level of the third power supply voltage drop signal VTMPLOW is stored in the bit 6, data corresponding to a logic level of the first power supply voltage drop signal VDDLOW is stored in the bit 5, data corresponding to a logic level of the oscillation stop signal FST is stored in the bit 4, data corresponding to a logic level of the first event signal EVIN1 is stored in the bit 3, and the upper 3-bit data of the 8-bit year data is stored in the bits 2 to 0.

At the address 0x7 of the memory circuit 60, data indicating a trigger factor of the time stamp processing is stored. Specifically, 1 is stored in the bit 7 when the third event signal EVIN3 is the trigger factor, 1 is stored in the bit 6 when the second event signal EVIN2 is the trigger factor, 1 is stored in the bit 5 when the first event signal EVIN1 is the trigger factor, 1 is stored in the bit 4 when the second power supply voltage drop signal VBATLOW is the trigger factor, 1 is stored in the bit 3 when the third power supply voltage drop signal VTMPLOW is the trigger factor, 1 is stored in the bit 2 when the first power supply voltage drop signal VDDLOW is the trigger factor, 1 is stored in the bit 1 when the oscillation stop signal FST is the trigger factor, and 1 is stored in the bit 0 when the event command detection signal WRCom is the trigger factor.

In the example of FIG. 4, the subsecond data, the second data, the minute data, the hour data, the day data, the month data, and the year data is the target time data, and all the other data is the target event data.

In the example of FIG. 4, the capture data CPDT to be a time stamp target is 64-bit data. In order for the selection circuit 50 to collectively write the capture data CPDT to the memory circuit 60, the 64-bit data needs to be allocated to one address of the memory circuit 60, and sizes of the memory circuit 60 and the selection circuit 50 increase. Therefore, in the embodiment, although the sizes of the memory circuit 60 and the selection circuit 50 are reduced by allocating 8-bit data to one address of the memory circuit 60 and performing, by the selection circuit 50, the processing of acquiring the 8-bit data and writing the 8-bit data in the memory circuit 60 eight times, at least eight cycles are required for the selection circuit 50 to acquire data necessary for the capture data CPDT. Therefore, when the time update timing at which the time data TM is updated arrives during a period in which the selection circuit 50 acquires the time data TM, there is a possibility that a part of the target time data included in the capture data CPDT is data before being updated, whereas another part of the target time data is data after being updated, and erroneous target time data is stored in the memory circuit 60.

Figure 5:
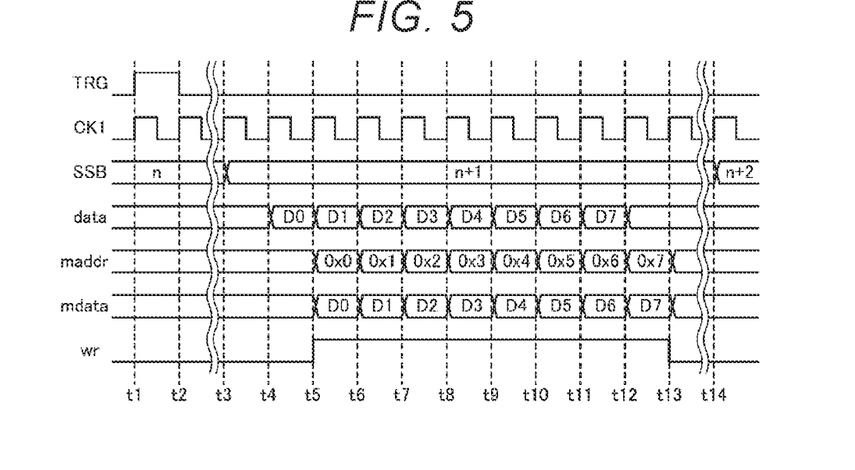
FIG. 5 is a timing chart showing an example of time stamp processing performed by a selection circuit.

Therefore, in the embodiment, the selection circuit 50 performs the time stamp processing of acquiring the target time data and causing the memory circuit 60 to store the target time data after an event is generated, that is, after the event trigger signal TRG is generated and a next time update timing arrives. FIG. 5 is a timing chart showing an example of the time stamp processing performed by the selection circuit 50. In FIG. 5, it is assumed that the capture data CPDT is 64-bit data.

In the example of FIG. 5, the event trigger signal TRG changes from a low level to a high level in synchronization with a rising edge of the first clock signal CK1 at a time t1, and the event trigger signal TRG changes from the high level to the low level in synchronization with the rising edge of the first clock signal CK1 at a time t2. That is, at the times t1 to t2, the event trigger signal TRG serving as a trigger for the time stamp processing is generated.

The time data TM is updated by changing subsecond data SSB from n to n+1 in synchronization with the rising edge of the first clock signal CK1 at a time t3. That is, the time t3 corresponds to the next time update timing after the event trigger signal TRG is generated.

After the time update timing arrives at the time t3, first, the selection circuit 50 acquires first 8-bit data D0 of the capture data CPDT to the data buffer 514 in synchronization with the rising edge of the first clock signal CK1 at a time t4.

Next, in synchronization with the rising edge of the first clock signal CK1 at a time t5, the selection circuit 50 sets a write signal wr to the high level, sets a memory address maddr to 0x0, and sets memory data mdata to the 8-bit data D0 held by the data buffer 514. The write signal wr, the memory address maddr, and the memory data mdata are supplied from the capture circuit 515 to the memory circuit 60. The selection circuit 50 acquires second 8-bit data D1 of the capture data CPDT to the data buffer 514 in synchronization with the rising edge of the first clock signal CK1 at the time t5.

Next, in synchronization with the rising edge of the first clock signal CK1 at a time t6, the 8-bit data D0 is written to the address 0x0 of the memory circuit 60. In synchronization with the rising edge of the first clock signal CK1 at the time t6, the selection circuit 50 sets the memory address maddr to 0x1 and sets the memory data mdata to the 8-bit data D1 held by the data buffer 514. Further, the selection circuit 50 acquires third 8-bit data D2 of the capture data CPDT to the data buffer 514 in synchronization with the rising edge of the first clock signal CK1 at the time t6.

Next, in synchronization with the rising edge of the first clock signal CK1 at a time t7, the 8-bit data D1 is written to the address 0x1 of the memory circuit 60. In synchronization with the rising edge of the first clock signal CK1 at the time t7, the selection circuit 50 sets the memory address maddr to 0x2 and sets the memory data mdata to the 8-bit data D2 held by the data buffer 514. Further, the selection circuit 50 acquires fourth 8-bit data D3 of the capture data CPDT to the data buffer 514 in synchronization with the rising edge of the first clock signal CK1 at the time t7.

Next, in synchronization with the rising edge of the first clock signal CK1 at a time t8, the 8-bit data D2 is written to the address 0x2 of the memory circuit 60. In synchronization with the rising edge of the first clock signal CK1 at the time t8, the selection circuit 50 sets the memory address maddr to 0x3 and sets the memory data mdata to the 8-bit data D3 held by the data buffer 514. Further, the selection circuit 50 acquires fifth 8-bit data D4 of the capture data CPDT to the data buffer 514 in synchronization with the rising edge of the first clock signal CK1 at the time t8.

Next, in synchronization with the rising edge of the first clock signal CK1 at a time t9, the 8-bit data D3 is written to the address 0x3 of the memory circuit 60. In synchronization with the rising edge of the first clock signal CK1 at the time t9, the selection circuit 50 sets the memory address maddr to 0x4 and sets the memory data mdata to the 8-bit data D4 held by the data buffer 514. Further, the selection circuit 50 acquires sixth 8-bit data D5 of the capture data CPDT to the data buffer 514 in synchronization with the rising edge of the first clock signal CK1 at the time t9.

Next, in synchronization with the rising edge of the first clock signal CK1 at a time t10, the 8-bit data D4 is written to the address 0x4 of the memory circuit 60. In synchronization with the rising edge of the first clock signal CK1 at the time t10, the selection circuit 50 sets the memory address maddr to 0x5 and sets the memory data mdata to the 8-bit data D5 held by the data buffer 514. Further, the selection circuit 50 acquires seventh 8-bit data D6 of the capture data CPDT to the data buffer 514 in synchronization with the rising edge of the first clock signal CK1 at the time t10.

Next, in synchronization with the rising edge of the first clock signal CK1 at a time t11, the 8-bit data D5 is written to the address 0x5 of the memory circuit 60. In synchronization with the rising edge of the first clock signal CK1 at the time t11, the selection circuit 50 sets the memory address maddr to 0x6 and sets the memory data mdata to the 8-bit data D6 held by the data buffer 514. Further, the selection circuit 50 acquires eighth 8-bit data D7 of the capture data CPDT to the data buffer 514 in synchronization with the rising edge of the first clock signal CK1 at the time t11.

Next, in synchronization with the rising edge of the first clock signal CK1 at a time t12, the 8-bit data D6 is written to the address 0x6 of the memory circuit 60. In synchronization with the rising edge of the first clock signal CK1 at the time t12, the selection circuit 50 sets the memory address maddr to 0x7 and sets the memory data mdata to the 8-bit data D7 held by the data buffer 514.

Next, in synchronization with the rising edge of the first clock signal CK1 at a time t13, the 8-bit data D7 is written to the address 0x7 of the memory circuit 60. The selection circuit 50 sets the write signal wr to the low level in synchronization with the rising edge of the first clock signal CK1 at the time t13.

Thereafter, the time data TM is updated by changing the subsecond data SSB from n+1 to n+2 in synchronization with the rising edge of the first clock signal CK1 at a time t14. That is, at the time t4, a further next time update timing arrives.

As described above, in the example of FIG. 5, after the event trigger signal TRG is generated at the times t1 to t2, the selection circuit 50 acquires each 8-bit data constituting the capture data CPDT and writes each 8-bit data into the memory circuit 60 during a period from the arrival of the next time update timing at the time t3 to the arrival of the further next time update timing at the time t14. Therefore, since the time update timing does not arrive during the period in which the selection circuit 50 acquires the target time data included in the capture data CPDT, the selection circuit 50 can cause the memory circuit 60 to store the target event data in association with correct target time data. Since the target event data is not affected by a change in time, the time update timing is allowed to arrive during a period in which the selection circuit 50 acquires the target event data.

As described above, in the real-time clock module 1 according to the first embodiment, in response to the generation of the event, the selection circuit 50 selects at least one of the plurality of types of event data as the target event data to be stored, selects data corresponding to at least a part of time digits of the time data TM as the target time data to be stored, and causes the memory circuit 60 to store the capture data CPDT including the target time data and the target event data. Specifically, in the selection circuit 50, the processor 51 selects the target time data and the target event data based on the command set 521 stored in the nonvolatile memory 52. Therefore, according to the real-time clock module 1 of the first embodiment, unnecessary event data for each application in the time stamp can be prevented from being stored in the memory circuit 60. Further, since the real-time clock module 1 writes the capture data CPDT to the memory circuit 60, a period of time during which the host device 6, which consumes more power than the real-time clock module 1, sleeps can be lengthened. Therefore, the power consumption of the entire system can be reduced.

In the real-time clock module 1 according to the first embodiment, the selection circuit 50 acquires the target time data and causes the memory circuit 60 to store the target time data after the event is generated and the next time update timing arrives. Therefore, according to the real-time clock module 1 of the first embodiment, since the time update timing does not arrive during the period in which the selection circuit 50 acquires the target time data in response to the generation of the event, the possibility that erroneous target time data is stored in the memory circuit 60 is reduced.

According to the real-time clock module 1 of the first embodiment, in response to the generation of the event, the selection circuit 50 can select, as the target event data, the first power supply voltage drop signal VDDLOW, the second power supply voltage drop signal VBATLOW, or the third power supply voltage drop signal VTMPLOW which are the power supply voltage monitoring data, and cause the memory circuit 60 to store the target event data.

According to the real-time clock module 1 of the first embodiment, in response to the generation of the event, the selection circuit 50 can select, as the target event data, the first event signal EVIN1, the second event signal EVIN2, the third event signal EVIN3, or the event command detection signal WRCom which are data corresponding to the external input signal for generating the event, and cause the memory circuit 60 to store the target event data.

2. Second Embodiment

In the real-time clock module 1 according to a second embodiment, the same components as those in the first embodiment are denoted by the same reference numerals, the description overlapping with the first embodiment is omitted or simplified, and contents different from those in the first embodiment will be mainly described.

Figure 6:
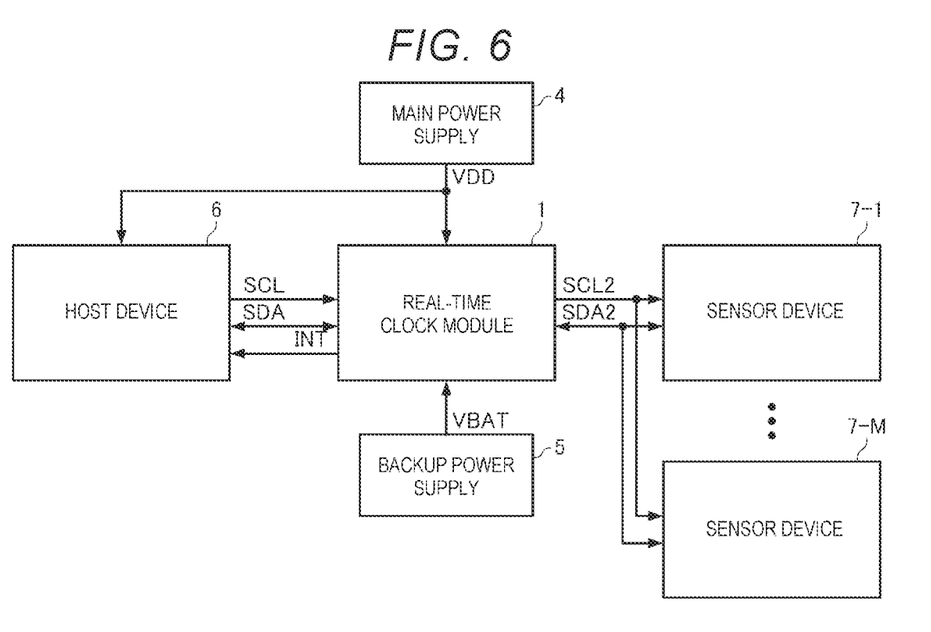
FIG. 6 is a diagram showing a configuration example of a system including a real-time clock module according to a second embodiment.

FIG. 6 is a diagram showing a configuration example of a system including the real-time clock module 1 according to the second embodiment.

As shown in FIG. 6, the real-time clock module 1 according to the second embodiment is coupled to the main power supply 4, the backup power supply 5, the host device 6, and M sensor devices 7-1 to 7-M. M is an integer of 1 or more.

Similarly to the first embodiment, the real-time clock module 1 is supplied with the power supply voltage VDD from the main power supply 4 and supplied with the power supply voltage VBAT from the backup power supply 5. The real-time clock module 1 operates at the power supply voltage VDD when the power supply voltage VDD is supplied from the main power supply 4, and operates at the power supply voltage VBAT when the supply of the power supply voltage VDD from the main power supply 4 is cut off. Therefore, the real-time clock module 1 can continue a timing operation even while the supply of the power supply voltage VDD from the main power supply 4 is cut off.

Similarly to the first embodiment, the host device 6 operates by being supplied with the power supply voltage VDD from the main power supply 4. The host device 6 and the real-time clock module 1 communicate with each other via the $I^2C$ bus with the host device 6 as a master and the real-time clock module 1 as a slave.

The sensor devices 7-1 to 7-M are, for example, temperature sensors, position information sensors, and inertial sensors. The real-time clock module 1 and the sensor devices 7-1 to 7-M communicate with each other via the $I^2C$ bus with the real-time clock module 1 as a master and the sensor devices 7-1 to 7-M as slaves.

Figure 7:
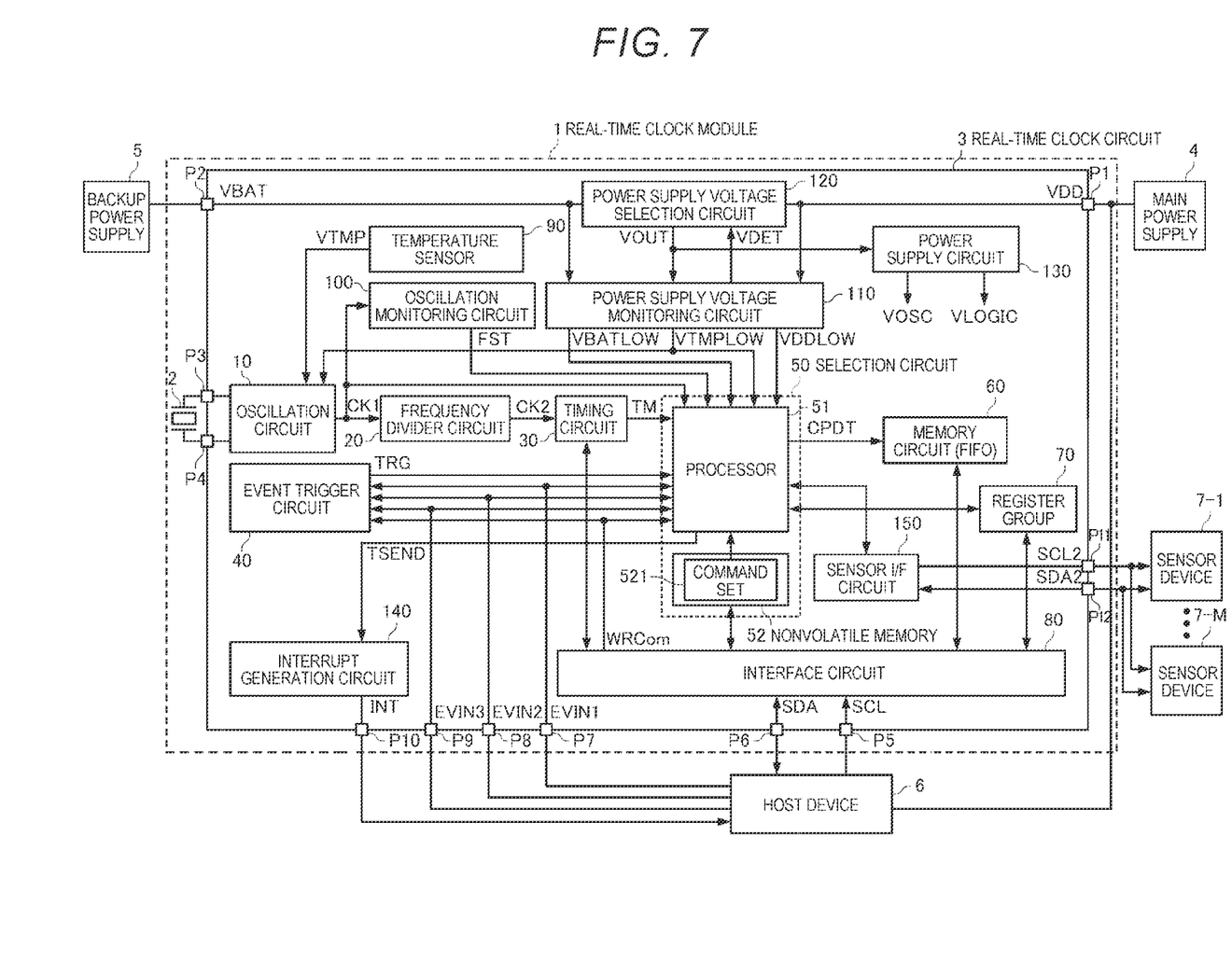
FIG. 7 is a functional block diagram of the real-time clock module according to the second embodiment.

FIG. 7 is a functional block diagram of the real-time clock module 1 according to the second embodiment. As shown in FIG. 7, the real-time clock module 1 according to the second embodiment is different from the real-time clock module 1 according to the first embodiment in that the sensor devices 7-1 to 7-M are coupled to the real-time clock module 1 and the real-time clock circuit 3 includes a sensor interface circuit 150.

The power supply voltage VLOGIC is supplied to the sensor interface circuit 150. The sensor interface circuit 150 is an interface circuit for communication between the real-time clock module 1 and the M sensor devices 7-1 to 7-M outside the real-time clock module 1. M is an integer of 1 or more. In the communication by the sensor interface circuit 150, the real-time clock module 1 is a master, specifically, the processor 51 is a master, and the sensor devices 7-1 to 7-M are slaves. That is, the sensor interface circuit 150 functions as a master interface for the sensor devices 7-1 to 7-M. In the embodiment, the sensor interface circuit 150 is an interface circuit compatible with the $I^2C$ bus, and communicates with the sensor devices 7-1 to 7-M based on a serial clock signal SCL2 output via a terminal P11 of the real-time clock circuit 3 and a serial data signal SDA2 input and output via a terminal P12 of the real-time clock circuit 3. However, the sensor interface circuit 150 may be an interface circuit compatible with other serial buses such as SPI, or may be an interface circuit compatible with a parallel bus.

The sensor interface circuit 150 transmits a command, according to an instruction of the processor 51, to the sensor devices 7-1 to 7-M via the terminals P11 and P12, and the sensor devices 7-1 to 7-M receive the command and perform various types of processing according to the command.

In particular, in the embodiment, the sensor interface circuit 150 transmits a command for requesting transmission of detected data to a sensor device 7-$i$ according to an instruction of the processor 51. The sensor device 7-$i$ receives the command and transmits the detected data to the sensor interface circuit 150. The sensor interface circuit 150 receives data detected by the sensor device 7-$i$, and transmits the received data to the processor 51. $i$ is an integer of 1 or more and M or less.

In the second embodiment, similarly to the first embodiment, in response to the generation of the event, that is, in response to the event trigger signal TRG, the selection circuit 50 selects at least one of a plurality of types of event data as target event data to be stored, and selects, as target time data to be stored, data corresponding to at least a part of time digits of the time data TM generated by the timing circuit 30.

Similarly to the first embodiment, the plurality of types of event data may include the first power supply voltage drop signal VDDLOW, the second power supply voltage drop signal VBATLOW, the third power supply voltage drop signal VTMPLOW, the oscillation stop signal FST, the first event signal EVIN1, the second event signal EVIN2, the third event signal EVIN3, and the event command detection signal WRCom.

Further, in the second embodiment, the plurality of types of event data further include the sensor data based on the data detected by the sensor devices 7-1 to 7-M. For example, one of the sensor devices 7-1 to 7-M may be a temperature sensor, and the sensor data may include temperature data. In this case, a temperature compensation circuit included in the oscillation circuit 10 may use data detected by the temperature sensor, which is one of the sensor devices 7-1 to 7-M, instead of the temperature signal VTMP output from the temperature sensor 90. For example, one of the sensor devices 7-1 to 7-M may be a position information sensor, and the sensor data may include position data. The position information sensor may be, for example, a GPS sensor. GPS is an abbreviation for a global positioning system or a global positioning satellite. For example, one of the sensor devices 7-1 to 7-M may be an inertial sensor, and the sensor data may include inertial data. For example, the inertial sensor may be an acceleration sensor, and the inertial data may be acceleration data. For example, the inertial sensor may be an angular velocity sensor, and the inertial data may be angular velocity data. For example, the inertial sensor may be an IMU, and the inertial data may be data including acceleration data and angular velocity data. IMU is an abbreviation for an inertial measurement unit.

The selection circuit 50 causes the memory circuit 60 to store the capture data CPDT including the target time data and the target event data. That is, the selection circuit 50 performs time stamp processing of causing the memory circuit 60 to store the target time data and the target event data in association with each other in response to the event trigger signal TRG.

Figure 8:
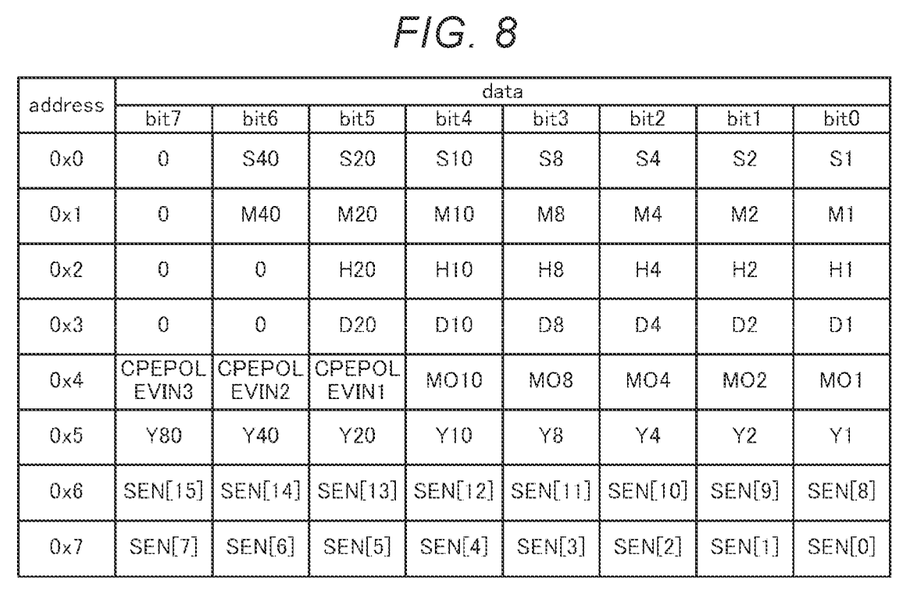
FIG. 8 is a diagram showing an example of capture data in the second embodiment.

FIG. 8 is a diagram showing an example of the capture data CPDT stored in the memory circuit 60 in the second embodiment. In the example of FIG. 8, the capture data CPDT is 64-bit data, and is stored in, for example, addresses 0x0 to 0x7 of the memory circuit 60.

Specifically, at the address 0x0 of the memory circuit 60, 0 is stored in the bit 7, and 7-bit second data included in the time data TM is stored in the bits 6 to 0.

At the address 0x1 of the memory circuit 60, 0 is stored in the bit 7, and 7-bit minute data included in the time data TM is stored in the bits 6 to 0.

At the address 0x2 of the memory circuit 60, 0 is stored in the bits 7 and 6, and 6-bit hour data included in the time data TM is stored in the bits 5 to 0.

At the address 0x3 of the memory circuit 60, 0 is stored in the bits 7 and 6, and 6-bit day data included in the time data TM is stored in the bits 5 to 0.

At the address 0x4 of the memory circuit 60, data corresponding to the logic level of the third event signal EVIN3 is stored in the bit 7, data corresponding to the logic level of the second event signal EVIN2 is stored in the bit 6, data corresponding to the logic level of the first event signal EVIN1 is stored in the bit 5, and 5-bit month data included in the time data TM is stored in the bits 4 to 0.

At the address 0x5 of the memory circuit 60, 8-bit year data included in the time data TM is stored in the bits 7 to 3.

At the address 0x6 of the memory circuit 60, upper 8-bit data of the sensor data is stored in the bits 7 to 0.

At the address 0x7 of the memory circuit 60, lower 8-bit data of the sensor data is stored in the bits 7 to 0.

In the example of FIG. 8, the second data, the minute data, the hour data, the day data, the month data, and the year data are the target time data, and all the other data are the target event data.

In the example of FIG. 8, the capture data CPDT to be a time stamp target is 64-bit data. 8-bit data is allocated to one address of the memory circuit 60, and the selection circuit 50 performs the processing of acquiring the 8-bit data and writing the 8-bit data in the memory circuit 60 eight times. Therefore, when the time update timing at which the time data TM is updated arrives during a period in which the selection circuit 50 acquires the time data TM, there is a possibility that a part of the target time data included in the capture data CPDT is data before being updated, whereas another part of the target time data is data after being updated, and erroneous target time data is stored in the memory circuit 60.

Therefore, in the second embodiment, similarly to the first embodiment, the selection circuit 50 also performs the time stamp processing of acquiring the target time data and causing the memory circuit 60 to store the target time data after an event is generated, that is, after the event trigger signal TRG is generated and a next time update timing arrives. The timing chart showing the example of the time stamp processing performed by the selection circuit 50 may be the same as that of FIG. 5, and thus illustration and description thereof will be omitted.

According to the real-time clock module 1 of the second embodiment described above, it is possible to achieve the same effects as those of the real-time clock module 1 of the first embodiment.

Further, according to the real-time clock module 1 of the second embodiment, in response to the generation of the event, the selection circuit 50 can select, as the target event data, the temperature data, the position data, the inertial data, and the like which are the sensor data, and cause the memory circuit 60 to store the target event data.

3. Modification

The present disclosure is not limited to the embodiments, and various modifications can be made within the scope of the gist of the present disclosure.

For example, in the above-described embodiments, the target time data and the target event data selected by the selection circuit 50 is the same regardless of the generation factors of the event trigger signal TRG, and may be different for each generation factor of the event trigger signal TRG.

For example, in the above-described embodiments, the processor 51 in the selection circuit 50 performs software processing based on the command set 521, and thus the target time data and the target event data can be freely selected. The selection circuit 50 may be implemented as hardware that selects the target time data and the target event data based on selection data freely set in a predetermined register included in the nonvolatile memory 52 or the register group 70.

For example, in the above-described embodiments, the command set 521 specifies the target time data and the target event data, and the target event data may be specified without specifying the target time data. That is, the type of the target time data selected by the selection circuit 50 may be fixed and the target time data may not be selected by the command set 521, and the target event data may be freely selected by the command set 521.

The embodiments and the modifications described above are merely examples, and the present disclosure is not limited thereto. For example, the embodiments and the modifications can be combined as appropriate.

The present disclosure includes a configuration substantially the same as the configurations described in the embodiments (for example, a configuration having the same functions, methods, and results, or a configuration having the same purposes and effects). The present disclosure includes a configuration obtained by replacing a non-essential portion of the configuration described in the embodiments. The present disclosure includes a configuration having the same functions and effects as the configuration described in the embodiments, or a configuration capable of achieving the same purpose. The present disclosure includes a configuration in which a known technique is added to the configuration described in the embodiments.

The following contents are derived from the above embodiments and modifications.

A real-time clock module according to one aspect includes:
- a timing circuit configured to measure a time to generate time data;
- a selection circuit configured to select at least one of a plurality of types of event data as target event data to be stored and select, as target time data to be stored, data corresponding to at least a part of time digits of the time data in response to generation of an event; and
- a memory circuit configured to store the target time data and the target event data.

According to the real-time clock module, since the target event data selected from the plurality of types of event data together with the target time data is stored in the memory circuit in response to the generation of the event, unnecessary event data for each application in the time stamp can be prevented from being stored.

In the real-time clock module according to one aspect, the selection circuit may include
- a nonvolatile memory configured to store a command set specifying the target event data, and
- a processor configured to select the target event data based on the command set.

According to this real-time clock module, by the processor selecting the target event data based on the command set, unnecessary event data for each application in the time stamp can be prevented from being stored in the memory circuit.

In the real-time clock module according to one aspect, the selection circuit may be configured to acquire the target time data and cause the memory circuit to store the target time data after a next time update timing arrives after the event generates.

According to the real-time clock module, since the time update timing does not arrive during the period in which the selection circuit acquires the target time data in response to the generation of the event, the possibility that erroneous target time data is stored in the memory circuit is reduced.

The real-time clock module according to one aspect may further include:
- a power supply voltage monitoring circuit configured to monitor a power supply voltage and generate power supply voltage monitoring data, in which
- the plurality of types of event data may include the power supply voltage monitoring data.

According to the real-time clock module, in response to the generation of the event, the power supply voltage monitoring data can be selected as the target event data and stored in the memory circuit.

In the real-time clock module according to one aspect, the event may be generated by an external input signal received from an outside of the real-time clock module, and the plurality of types of event data may include data corresponding to the external input signal.

According to the real-time clock module, in response to the generation of the event, data corresponding to the external input signal for generating the event can be selected as the target event data and stored in the memory circuit.

In the real-time clock module according to one aspect, the plurality of types of event data may include sensor data based on data detected by an external sensor device.

According to the real-time clock module, in response to the generation of the event, the sensor data can be selected as the target event data and stored in the memory circuit.

In the real-time clock module according to one aspect, the sensor device may be a temperature sensor, and the sensor data may include temperature data.

According to the real-time clock module, in response to the generation of the event, the sensor data including the temperature data can be selected as the target event data and stored in the memory circuit.

In the real-time clock module according to one aspect, the sensor device may be a position information sensor, and the sensor data may include position data.

According to the real-time clock module, in response to the generation of the event, the sensor data including the position data can be selected as the target event data and stored in the memory circuit.

In the real-time clock module according to one aspect, the sensor device may be an inertial sensor, and the sensor data may include inertial data.

According to the real-time clock module, in response to the generation of the event, the sensor data including the inertial data can be selected as the target event data and stored in the memory circuit.

The real-time clock module according to one aspect may further include:
- a resonator; and
- an oscillation circuit configured to generate a clock signal by oscillating the resonator, in which
- the timing circuit may be configured to measure the time based on the clock signal.

According to the real-time clock module, it is possible to measure the time based on a highly accurate clock signal acquired by oscillating the resonator.

What is claimed is:

1. A real-time clock module comprising:
   - a timing circuit configured to measure a time to generate time data;
   - a selection circuit configured to select at least one of a plurality of types of event data as target event data to be stored and select, as target time data to be stored, data corresponding to at least a part of time digits of the time data in response to generation of an event; and
   - a memory circuit configured to store the target time data and the target event data.

2. The real-time clock module according to claim 1, wherein
   the selection circuit includes
   - a nonvolatile memory configured to store a command set specifying the target event data, and
   - a processor configured to select the target event data based on the command set.

3. The real-time clock module according to claim 1, wherein the selection circuit is configured to acquire the target time data and cause the memory circuit to store the target time data after a next time update timing arrives after the event generates.

4. The real-time clock module according to claim 1, further comprising:
a power supply voltage monitoring circuit configured to monitor a power supply voltage and generate power supply voltage monitoring data, wherein
the plurality of types of event data include the power supply voltage monitoring data.

5. The real-time clock module according to claim 1, wherein
the event is generated by an external input signal received from an outside of the real-time clock module, and
the plurality of types of event data include data corresponding to the external input signal.

6. The real-time clock module according to claim 1, wherein
the plurality of types of event data include sensor data based on data detected by an external sensor device.

7. The real-time clock module according to claim 6, wherein
the sensor device is a temperature sensor, and
the sensor data includes temperature data.

8. The real-time clock module according to claim 6, wherein
the sensor device is a position information sensor, and
the sensor data includes position data.

9. The real-time clock module according to claim 6, wherein
the sensor device is an inertial sensor, and
the sensor data includes inertial data.

10. The real-time clock module according claim 1, further comprising:
a resonator; and
an oscillation circuit configured to generate a clock signal by oscillating the resonator, wherein
the timing circuit is configured to measure the time based on the clock signal.

* * * * *